United States Patent Office 3,681,094
Patented Aug. 1, 1972

3,681,094
MEAT AND GRAVY PRODUCT AND METHOD
OF MAKING SAME
Alan B. Rogers, Palos Park, and Donald V. Schwall, Glen Ellyn, Ill., assignors to Armour and Company, Chicago, Ill.
No Drawing. Filed Jan. 21, 1970, Ser. No. 4,763
Int. Cl. A23b 1/00; A22c 18/00, 21/00
U.S. Cl. 99—187       10 Claims

ABSTRACT OF THE DISCLOSURE

A meat product, such as a meat roast or loaf, is packaged with a gravy mixture. Gelatin is incorporated within the gravy mixture, and the gravy mixture is placed in the bottom of a container. The gravy containing gelatin is allowed to set, and thereafter the meat product is placed on top of the gelled gravy without substantial commingling of the meat and gravy ingredients. Upon cooking the meat product, the cook-out juices exuded therefrom mix with the gravy mixture.

BACKGROUND OF THE INVENTION

A variety of food products, including many meat products, are prepared and packaged in such a manner so as to provide the consumer with a product which is convenient and easy to prepare. For this reason, meat products such as loaves, roasts and the like, are commonly packaged in metal containers, such as aluminum pans, which may be placed directly into an oven for cooking the product contained therein.

Such roasts or loaves may be fashioned from a single piece of meat or may be fashioned from a plurality of meat pieces bound together in some fashion. For example, chunks or pieces of poultry meat may be agitated with an edible metallic salt until a sticky, tacky exudate of salt soluble protein appears on the surface of the pieces, whereafter the chunks or pieces may be pressed into a metallic container to form a roast or loaf which will remain intact upon cooking. Methods by which such loaves or roasts may be made are disclosed in U.S. Pats. 3,285,752; 3,285,753; 3,416,931 and 3,413,127.

We have found that it is desirable to provide such roasts, loaves, and the like, in a package in which gravy may be packaged along with the meat product. However, the production of such a meat product with gravy gives rise to several problems.

If the meat is placed into the container first, and the gravy thereafter is placed on top of the meat, we have found that such a system may produce an esthetically unappealing package. Moreover, when the meat product is later cooked, the gravy will tend to remain on the top surface of the roast and perhaps burn or boil away. Also, the cook-out juices from the meat product will run to the bottom of the pan and will not have an opportunity to mix with the gravy packaged on the top. Additionally, the existence of the gravy on the top of the roast prevents the roast from browning during cooking.

If liquid gravy is placed on the bottom of the container and the meat product later placed on top of the liquid gravy, the gravy is displaced by the meat product, and tends to migrate between the side of the meat product and the sides of the container up to the top of the meat product. The liquid gravy is splashed and oozed out of the container, resulting in a loss of product and a rather messy package.

For many reasons, therefore, including those enumerated above, it was not considered commercially feasible to package a meat roast or loaf in a cooking pan and to incorporate gravy therein.

SUMMARY OF THE INVENTION

We have discovered a meat product with gravy and a method for preparing same wherein gravy may be successfully incorporated with a meat roast or loaf in a single cooking container. Gelatin is incorporated into a gravy mixture which is placed into the bottom of a container. The gravy mixture is then cooled sufficiently to allow the gravy to set. The meat product is then placed on top of the gelled gravy, the gravy remaining substantially intact and without substantial commingling of the meat and gravy ingredients. When the meat product is cooked in the container, the cook-out juices drip down into the gravy, which has become liquid at cooking temperatures to form a tasty gravy product. Moreover, at cooking and serving temperatures the gravy becomes a liquid having the characteristics of a normal gravy.

It is an object of the present invention therefore to provide a meat product with gravy contained within a single cooking container.

It is a further object of the present invention to provide a meat product and gravy, in which the meat product is packaged on top of the gravy.

A still further object of the present invention is to provide a process to incorporate a gravy mixture with a meat product in a cooking container.

A further object and advantages of the present invention will become apparent as the specification proceeds.

DESCRIPTION OF PREFERRED EMBODIMENTS

Although the method of the present invention can be used with a variety of meat products to be packaged with a gravy, the invention is well suited to meat products such as roasts, loaves and the like, which are packaged in a cooking container, such as an aluminum roasting pan, including a roasting pan fashioned from an aluminum foil material.

By roast or loaf, we refer to meat roasts formed from a single piece of meat such as beef, pork, lamb, mutton, poultry, or the like, and also meat loaves or roasts which have been formed from a plurality of pieces of meat or ground meat of the type mentioned or a combination thereof, which have been pressed, molded, formed, or extruded into a roast or loaf-like shape. For example, the process can be used in the manufacture of a turkey roast wherein chunks or pieces of poultry meat are agitated in the presence of an edible metallic salt until a creamy, sticky coating of salt soluble protein exudate forms on the surface of the pieces, and the pieces are pressed together in the cooking container to form a roast or loaf-type of product.

The gravy mixture may be prepared from typical gravy ingredients such as water, fat, flour, starch, flavorings and spices. In the present product gelatin is also an essential ingredient of the gravy, and may be added in the dry form or it may be dissolved in water and added to the gravy with the water ingredient. The invention is not intended to be limited to the particular method of incorporating the gelain into the gravy mixture.

The amount of gelatin added may be varied depending upon the degree of rigidity desired in the gravy product, the gel strength of the gelatin used and the like. When using a relatively high strength gelatin of about 275 bloom, the incorporation of from about 1.5% to about 6% of such gelatin gives satisfactory results. Amounts of gelatin substantially less than 1.5% may result in a gravy of insufficient gel strength to adequately support the meat product. Although amounts of gelatin in excess of about 6.0% may be used, if desired, we have found with a gelatin of sufficient bloom strength, gelatin amounts in excess of 6.0% are not necessary to produce the desired result and may become economically disadvantageous. Adding the gelatin in an amount of about 3.5% to 4.5% is especially preferred.

The gelatin added may be of various bloom strengths, the bloom strength being the weight in grams required to produce a 4 millimeter depression in a gelatin gel of standard strength (6.66% wt./wt.) at a fixed temperature by a plunger of fixed dimensions. Such bloom strengths generally vary between 50 and 300 bloom, and we prefer to use the stronger bloom strength gelatins of about 200 to 300 bloom, and preferably 275 bloom. Gelatin of bloom strengths from 50 to 200 can be used, but use of these gelatins may be economically unfeasible because of amounts of gelatin required and time required for the gelatin to set.

After the gravy mixture has been prepared, any desired amounts may be placed into the empty roast or loaf container while the gravy mixture is at a sufficiently warm temperature to remain flowable. The gravy mixture may then be cooled to a temperature sufficiently low to allow the gelatin to set. By "set" we refer to the semirigid rubbery state which is attained by chilled gelatin at temperatures substantially above freezing. The temperature at which the gelatin will set may vary within farily wide ranges depending upon the bloom strength of the gelatin used. We prefer to employ gelatin concentrations and gel strengths which will set at temperatures from about 50° to 70° F., that is, within the general range of normal meat processing room temperatures.

After the gravy mixture has gelled, the meat product may be placed on top of the gravy in order to fill the container to the desired level. We have discovered that when using the gravy of the present invention, the gelled gravy has sufficient rigidity to allow pieces of meat having a tacky coating to be pressed into the container to form a loaf or roast shape without substantially disturbing the gelled gravy from its position in the bottom of the container.

After insertion of the meat product, the container may be closed and processed further, as desired. For example, the meat and gravy product may be frozen and sold in a frozen and uncooked condition. Alternatively, the meat and gravy product may be simply held under refrigeration temperatures to retard spoilage and vended in that manner.

In general, water to which gelatin is added, must be heated above room temperature in order to fully solubilize the gelatin in the water within a reasonable period of time. In the operation of the present process, the water may be heated before the gelatin is added, or the gelatin may be added to tap water which may then be heated in order to fully dissolve the gelatin. We prefer to add the gelatin and flavoring ingredients to tap water in a steam-jacketed kettle. The water may be at about room temperature. The water may then be heated to a temperature of about 120° to 175° F. in order to fully solubilize the gelatin. We prefer to heat the water to a temperature of about 140° to 165° F., stirring the mixture as it is heated until the gelatin is fully dissolved. Somewhat higher water temperatures may be used if desired, especially when the water is heated prior to incorporating the gelatin, in which case an initial water temperature of about 200° F. may be desired.

After the mixture has been heated to dissolve the gelatin, the temperature at which the gelatin will set in the mixture will depend somewhat on the concentration of gelatin added and the bloom strength of the gelatin. For example, we have found that when using 275 bloom gelatin in a concentration of about 4.0%, the mixture will begin to set at approximately 80° F. It is therefore preferred to reduce the temperature of the heated mixture to a temperature close to the gel temperature as quickly as possible so that the gravy mixture is near its gel temperature when it is added to the roast or loaf container. The cooling of the gravy mixture may be accomplished by any known cooling techniques, however, we prefer to add ice to the heated gravy mixture in order to accomplish the desired cooling. When using this technique, we prefer to initially dissolve the gelatin and flavoring ingredients in about ⅔ of the final required volume of water, heat the mixture to dissolve the gelatin, and then add the remaining water in the form of ice in order to bring the mixture to the proper concentration of ingredients and also cool it in a single operation.

We prefer to cool the heated gravy mixture to a temperature near the gel temperature of the mixture. For example, when using 275 bloom gelatin in a concentration of about 4.0%, we prefer to cool the mixture to a temperature of from about 80 to 90° F. At the temperature in this range, the mixture is still fluid and flowable and can be added to the roast or loaf containers using available liquid filling apparatus. Moreover, since the temperature at the time the gravy mixture is put into the containers is close to the gel temperature, little time is needed thereafter in order to reduce the temperature of the gravy mixture further and set the gel in the container prior to the insertion of the meat product. It will be understood, of course, that the invention is not limited to this particular technique, and the heated gravy mixture can be added directly to the meat or roast container and allowed to cool in the container itself. Alternatively, the gelatin may be super-cooled with agitation to a temperature below the normal setting temperature whereby the gelatin will set almost immediately upon the cessation of agitation. In this manner, the gelatin gravy mixture may be agitated until it is filled into the container.

Once the gravy mixture has been added to the container, it may simply be allowed to cool at room temperature until the gel is set. If more rapid cooling is desired, the containers may be placed in an ice water bath. Generally temperatures in the range of 50° F. to 70° F. are adequate to provide a well set up gelatin with sufficient firmness to support a meat roast thereon.

When the gravy mixture has set in the bottom of the container, the meat roast or loaf may then be placed on top of the gelled gravy. This may be accomplished by setting a roast on top of the gravy when the roast is made up of a single piece or has been previously formed into a roast or loaf configuration. Alternatively, the chunks or pieces of meat used to make the meat product may be placed into the container on top of the gelled gravy and pressed, formed, or molded into the desired roast or loaf configuration. In this manner, the meat and gravy are in layered relationship, wtih the meat resting on top of the gravy and is partially supported by the gravy. The meat and gravy product may then be further processed as desired, such as closing and sealing the container, freezing, refrigerating, or the like.

The present method and product will be further explained by reference to the following examples.

Example I

A gravy mixture of 342 lbs., 2 oz., was made using the following ingredients in the percentages indicated:

| Ingredient: | Percent by wt. |
|---|---|
| Water | 89.15 |
| Vegetable shortening | 5.0 |
| Gelatin, 275 bloom | 4.0 |
| Flavorings and spices | 1.85 |

Tap water at 52° F. was used, to which the gelatin, flavorings and spices were added. The ingredients were placed in a steam jacketed kettle and the temperature was raised to 165° F. with stirring. The vegetable shortening was added and stirred in. The mixture was allowed to cool to about 90° F. at which time approximately 8 oz. of gravy mixture was filled into each of several aluminum foil roasting pans. The gravy mixture was then alowed to cool at room temperature until the mixture had set and became quite firm at about 70° F. Pieces of raw turkey meat which had been agitated in the presence of edible metallic salt until a sticky coating of salt soluble protein had formed on the surfaces of the pieces was added to each foil pan, approximately 2 lbs. of meat being added to each pan. The meat pieces were pressed together to form a roast-like shape on top of the gelled gravy. There was no substantial mixing of the meat and gravy materials and the gravy maintained its integrity as a layer beneath the meat roast.

Example II

A gravy mixture of 1000 lbs. was made using the following ingredients in the percentages indicated:

| Ingredient: | Percent by wt. |
| --- | --- |
| Water | 59.44 |
| Ice | 29.71 |
| Vegetable shortening | 5.0 |
| Gelatin, 275 bloom | 4.0 |
| Flavorings and spices | 1.85 |

The water was placed at tap water temperature in a steam jacketed kettle. The gelatin, flavorings and spices were added and mixed into the water. Steam was introduced into the jacket of the kettle and the temperature of the mixture raised to 160° F. The vegetable shortening was then added and thoroughly mixed in. The ice was then added, cooling the mixture to about 85° F. and bringing the water content of the mixture to the desired total proportion. The mixture was filled into aluminum foil roasting pans and allowed to set as in Example I. Turkey meat was added and formed as in Example I. There was no substantial mixing of the meat and gravy materials and the gravy maintained its integrity as a layer beneath the meat roast.

While in the foregoing specification and examples, we have set forth considerable details for the purposes of explaining the present invention, it will be understood that the invention is not limited thereby and is intended to include modifications made by those skilled in the art which fall within the scope of the appended claims.

What is claimed is:

1. The process for making a meat product with gravy comprising the steps of forming a liquid gravy mixture including water and gelatin, said gelatin being in an amount of at least 1.5% of the mixture and having a bloom strength of from 50 to 300, placing said liquid gravy mixture in a container, cooling said mixture to a setting temperature whereby a gelled gravy is formed in the container, and placing meat on top of said gelled gravy, to form a meat and gravy product wherein the meat lies substantially on top of the gravy.

2. The process of claim 1 wherein said gelatin comprises about 1.5% to about 6.0% of said gravy mixture.

3. The process of claim 1 wherein said gelatin comprises about 4.0% of said gravy mixture.

4. The process of claim 1 wherein said gelatin has a gel strength of about 275 bloom.

5. The process of claim 1 wherein said liquid gravy mixture is formed by adding said gelatin to said water at about room temperature and thereafter raising the temperature of said mixture to about 120° F. to 175° F. to solubilize said gelatin.

6. The process according to claim 5 including the step wherein ice is added to said gravy mixture after said gelatin has been solubilized to reduce the temperature of said gravy mixture to a temperature of about 80-90° F.

7. A process as set forth in claim 1 wherein said meat is a shape-sustaining loaf made by binding together a plurality of meat pieces.

8. A meat and gravy product prepared in accordance with the process of claim 1.

9. A meat and gravy product prepared in accordance with the process of claim 1 wherein said meat is turkey meat.

10. A meat and gravy product prepared in accordance with the process of claim 1 wherein said container is a metallic foil roasting pan and said gravy is in the form of a layer on the bottom of said pan.

References Cited

UNITED STATES PATENTS

| 3,115,410 | 12/1963 | Huffman | 99—108 X |
| 2,721,142 | 10/1955 | Shinn et al. | 99—169 |
| 2,768,086 | 10/1956 | Bliley | 99—194 X |
| 3,573,067 | 3/1971 | Shults | 99—194 X |

HYMAN LORD, Primary Examiner

U.S. Cl. X.R.

99—107, 194